United States Patent
Archer et al.

(10) Patent No.: US 10,026,958 B2
(45) Date of Patent: Jul. 17, 2018

(54) CARBON DIOXIDE ASSISTED METAL-OXYGEN BATTERY AND RELATED METHOD

(71) Applicant: CORNELL UNIVERSITY, Ithaca, NY (US)

(72) Inventors: Lynden A. Archer, Ithaca, NY (US); Shaomao Xu, Ithaca, NY (US); Wajdi Issam Al Sadat, Freeville, NY (US)

(73) Assignee: Cornell University, Ithaca, NY (US)

( * ) Notice: Subject to any disclaimer, the term of this patent is extended or adjusted under 35 U.S.C. 154(b) by 114 days.

(21) Appl. No.: 14/440,680

(22) PCT Filed: Nov. 5, 2013

(86) PCT No.: PCT/US2013/068469
§ 371 (c)(1),
(2) Date: May 5, 2015

(87) PCT Pub. No.: WO2014/074504
PCT Pub. Date: May 15, 2014

(65) Prior Publication Data
US 2015/0295234 A1    Oct. 15, 2015

Related U.S. Application Data

(60) Provisional application No. 61/723,022, filed on Nov. 6, 2012.

(51) Int. Cl.
| | | |
|---|---|---|
| H01M 4/38 | (2006.01) | |
| H01M 4/583 | (2010.01) | |
| H01M 12/04 | (2006.01) | |
| H01M 12/08 | (2006.01) | |
| H01M 4/134 | (2010.01) | |
| H01M 12/06 | (2006.01) | |
| H01M 10/054 | (2010.01) | |
| H01M 4/96 | (2006.01) | |
| H01M 10/05 | (2010.01) | |
| H01M 4/86 | (2006.01) | |

(52) U.S. Cl.
CPC ............ *H01M 4/38* (2013.01); *H01M 4/134* (2013.01); *H01M 4/381* (2013.01); *H01M 4/583* (2013.01); *H01M 4/96* (2013.01); *H01M 10/054* (2013.01); *H01M 12/04* (2013.01); *H01M 12/06* (2013.01); *H01M 12/08* (2013.01); *H01M 4/8605* (2013.01); *H01M 10/05* (2013.01); *H01M 2004/8689* (2013.01); *Y02E 60/128* (2013.01)

(58) Field of Classification Search
CPC ...... H01M 4/134; H01M 12/06; H01M 4/381; H01M 10/054; H01M 12/08; H01M 4/38; H01M 4/583; H01M 12/04; H01M 4/96; H01M 10/05; H01M 4/8605; H01M 2004/8689; Y02E 60/128
See application file for complete search history.

(56) References Cited

U.S. PATENT DOCUMENTS

| | | | |
|---|---|---|---|
| 5,558,947 A | 9/1996 | Robison | |
| 5,593,552 A | 1/1997 | Joshi et al. | |
| 6,127,061 A | 10/2000 | Shun et al. | |
| 8,309,260 B2 | 11/2012 | Moore | |
| 2004/0234865 A1 | 11/2004 | Sato et al. | |
| 2007/0065686 A1 | 3/2007 | Fan et al. | |
| 2010/0151336 A1 | 6/2010 | Nakanishi | |
| 2011/0027664 A1 | 2/2011 | Burchardt et al. | |
| 2011/0223494 A1* | 9/2011 | Feaver .................. H01M 4/926 429/405 |
| 2012/0021303 A1 | 1/2012 | Amendola et al. | |
| 2012/0094193 A1* | 4/2012 | Albertus ............... H01M 12/08 429/339 |
| 2012/0270116 A1* | 10/2012 | Cho ...................... H01M 12/06 429/405 |
| 2013/0011754 A1 | 1/2013 | Tanaami et al. | |
| 2013/0017432 A1* | 1/2013 | Roumi ................ H01M 2/1686 429/145 |
| 2013/0115528 A1 | 5/2013 | Lu | |
| 2013/0143132 A1 | 6/2013 | Mizuno | |
| 2013/0157149 A1 | 6/2013 | Peled et al. | |
| 2013/0164638 A1* | 6/2013 | Tanaami ............... H01M 12/08 429/406 |
| 2013/0183591 A1 | 7/2013 | Dickson | |
| 2013/0224576 A1* | 8/2013 | Rosciano ............ C07D 295/088 429/199 |

FOREIGN PATENT DOCUMENTS

| | | | |
|---|---|---|---|
| JP | 2001210364 A | 8/2001 | |
| WO | 1999060654 A1 | 11/1999 | |
| WO | 2013077870 A1 | 5/2013 | |

OTHER PUBLICATIONS

International Search Report for International Application No. PCT/US2013/068469; International Filing Date Nov. 5, 2013, pp. 1-10.
Hartmann et al., A Rechargeable Room-Temperature Sodium Superoxide (NaO2) Battery, Nature Materials, vol. 12, Mar. 2013 pp. 228-232.
Lee et al., Metal-Air Batteries With High Energy Density: Li-Air Versus Zn-Air, Adv. Energy Materials, 1, pp. 34-50 (2011).
Cheng et al., Metal-Air Batteries: From Oxygen Reduction Electrochemistry to Cathode Catalysts, Chem. Soc. Rev. (2012), vol. 41, pp. 2172-2192.
Takechi et al., Chem. Commun., 2011, 47, 3463-65.
Mizuno et al, Electrochemical Society of Japan, 2010, 78(5): 403-405.

* cited by examiner

*Primary Examiner* — Muhammad S Siddiquee
(74) *Attorney, Agent, or Firm* — McDermott Will & Emery LLP (57) ABSTRACT

A non-aqueous Na-oxygen battery utilizes a gas mixture of $CO_2$ and $O_2$ as fuel. The battery exhibits a comparatively high specific energy of 6500-7000 $Whkg^{-1}$ over a range of $CO_2$ feed compositions. The energy density achieved is higher, by 200% to 300%, than obtained with pure oxygen feed. Ex-situ FTIR and XRD analysis confirm $Na_2O_2$, $Na_2C_2O_4$ and $Na_2CO_3$ as discharge products. The Na—$O_2$/$CO_2$ battery provides a promising approach for $CO_2$ capture and conversion into electrical energy. The Na—$O_2$/$CO_2$ battery may be extended to other metals. In addition, operation of a metal battery fueled at least in-part by carbon dioxide within an optimal temperature range is considered.

14 Claims, 12 Drawing Sheets

CARBON DIOXIDE ASSISTED METAL-OXYGEN BATTERY AND RELATED METHOD

CROSS-REFERENCE TO RELATED APPLICATION

This application is related to, and derives priority from, U.S. Provisional Patent Application Ser. No. 61/723,022, filed Nov. 6, 2012 and titled Carbon Dioxide Assisted Metal-Oxygen Battery, the contents of which is incorporated herein fully by reference.

STATEMENT OF GOVERNMENT INTEREST

The research undertaken within the context of the embodiments as described herein, and the invention as claimed herein, was supported by the United States Department of Energy through the Energy Materials Center at Cornell University, under award number DE-SC0001086. The United States Government may have rights with respect to the invention as claimed herein.

BACKGROUND

Field of the Invention

Embodiments relate generally to batteries fueled at least in-part by carbon dioxide. More particularly, embodiments relate to enhanced performance batteries fueled at least in-part by carbon dioxide.

Description of the Related Art

Growing interest in electrochemical energy storage for transportation and grid storage has resulted in an intensive search for alternative energy storage technologies that offer specific energies above those achievable (~200 Whkg$^{-1}$) with state-of-the-art lithium-ion batteries. More than a decade of research into such storage platforms has helped define the magnitude of the challenges that must be overcome for lithium-ion batteries to achieve specific energies in the 500-700 Whkg$^{-1}$ range. In this context, metal-air batteries and related metal-oxygen batteries are gaining focus because of their exceptionally high specific energies. Among the various metal-air or metal-oxygen batteries, the Li-air (or Li-oxygen) and Zn-air (or Zn-oxygen) technologies have attracted most attention.

Since metal-air or metal-oxygen batteries provide promise due to their high specific energies, desirable are additional metal-air or metal-oxygen batteries and methods for fabrication thereof.

SUMMARY

Embodiments provide a carbon dioxide assisted metal-oxygen battery (i.e., M-$O_2$/$CO_2$) and a generalized method for operating a metal battery fueled at least in-part by carbon dioxide.

The carbon dioxide assisted metal-oxygen battery provides a higher energy density output per unit material in comparison with a metal-oxygen battery absent carbon dioxide assistance. The generalized method for operating the metal battery fueled at least in-part by carbon dioxide provides for operation of the at least in-part carbon dioxide fueled metal battery above a threshold temperature below which the at least in-part carbon dioxide fueled metal battery operates inefficiently.

A particular carbon dioxide assisted metal-oxygen battery includes a positive electrode contacted by an oxygen and carbon dioxide containing fuel mixture. This particular carbon dioxide assisted metal-oxygen battery also includes a negative electrode comprising a metal material selected from the group consisting of sodium, magnesium, aluminum, zinc, calcium, copper and iron containing metal materials. This particular carbon dioxide assisted metal-oxygen battery also includes an electrolyte separating the positive electrode and the negative electrode.

Another particular carbon dioxide assisted metal-oxygen battery includes a positive electrode contacted by an oxygen and carbon dioxide containing fuel mixture having an oxygen:carbon dioxide fuel volume ratio from about 10:90 to about 90:10. This other particular carbon dioxide assisted metal-oxygen battery also includes a negative electrode comprising sodium metal. This other particular carbon dioxide assisted metal-oxygen battery also includes an electrolyte separating the positive electrode and the negative electrode.

A particular method for operating a metal battery fueled at least in-part by carbon dioxide includes providing a metal battery comprising: (1) a positive electrode contacted by at least a carbon dioxide containing fuel; (2) a negative electrode comprising a metal material; and (3) an electrolyte separating the positive electrode and the negative electrode. This particular method also includes operating the battery at a temperature greater than about 40 degrees centigrade.

Another particular method for operating a metal battery fueled at least in-part by carbon dioxide includes providing a battery comprising: (1) a positive electrode contacted by a fuel consisting of carbon dioxide; (2) a negative electrode comprising a metal; and (3) an electrolyte separating the positive electrode and the negative electrode. This other particular method also includes operating the battery at a temperature greater than about 40 degrees centigrade.

In accordance with further disclosure below, a "metal material" as disclosed and claimed herein is in a first instance intended as one of a pure metal and a metal alloy including at least one metal selected from the group consisting of sodium, magnesium, aluminum, zinc, calcium, copper and iron metals. A "metal material" as disclosed and claimed herein is in a second instance also intended to include a metal oxyanion salt including at least one metal selected from the group consisting of sodium, magnesium, aluminum, zinc, calcium, copper and iron metals.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the accompanying drawings, that form a material part of this disclosure, wherein:

FIG. 1 shows galvanostatic discharge profiles for Na-air cells operated under mixed $O_2$/$CO_2$. (A) ionic liquid electrolyte; (B) tetraglyme electrolyte; (C) variation of capacity with $CO_2$ concentration; (D) discharge profile for tetraglyme-based Na—$O_2$/$CO_2$ cells with a $O_2$ (37%)/$CO_2$ (63%) fuel. FIG. 1 also shows AC impedance spectra of Na-air cells at open circuit under: (E) Ar; and (F) $O_2$/$CO_2$ atmospheres.

FIG. 2 shows ex-situ TEM micrographs of Super P carbon (A), discharged carbon electrodes harvested from ionic liquid (B) and tetraglyme (C) cells; (D) ex-situ XRD of Super P electrode (a), and electrodes obtained from Na—$O_2$ ionic liquid cell (b), Na—$O_2$/$CO_2$ ionic liquid cell (c) and Na—$O_2$/$CO_2$ tetraglyme cell (d); @, #, $, % denote graphitic carbon, $Na_2O_2$, $Na_2C_2O_4$, $Na_2CO_3$ phases respectively. Ex-situ FTIR spectra of Super P carbon (Ea, Fa), ionic liquid electrolyte (Eb), tetraglyme electrolyte (Fb), discharged carbon electrodes harvested from: Na—$O_2$ cells based on ionic liquid (Ec) and tetraglyme (Fc), Na—$O_2$/$CO_2$ cells based on ionic liquid (Ed) and tetraglyme (Fd). $, #, * denote vibrations from $Na_2O_2$, $Na_2C_2O_4$, and $Na_2CO_3$ respectively.

DETAILED DESCRIPTION OF THE
NON-LIMITING EMBODIMENTS

A.1. Carbon Dioxide Assisted Metal Oxygen (M-$O_2/CO_2$) Battery

An air battery utilizing Na as anode is particularly attractive because of the high earth abundance, modest cost, and relatively high electrode potential (−2.71 V vs SHE) that may be achieved. Coupled with $O_2$, Na has the ability to deliver a specific energy of 1600 Whkg$^{-1}$ (2Na$^+$+ $O_2$+2e$^-$→$Na_2O_2$ at 2.33 V).

$CO_2$ is a greenhouse gas and has been implicated in global climate change. A variety of chemical and physical methodologies is under development for capturing and sequestering the thousands of metric tons of the gas emitted per annum. A metal-air battery that utilizes a mixed fuel of $CO_2$ and $O_2$ provides a potentially novel platform for electrical energy generation and carbon capture.

The embodiments provide in particular, among other carbon dioxide assisted metal oxygen M-$O_2/CO_2$ battery constructions, a Na—$O_2/CO_2$ battery operated at room temperature utilizing tetraglyme and an ionic liquid as electrolyte.

2. General Considerations Related to Carbon Dioxide Assisted Metal Oxygen Battery In general, embodiments provide a carbon dioxide assisted metal-oxygen battery comprising: (1) a positive electrode contacted by an oxygen and carbon dioxide fuel mixture (i.e., which may have an oxygen:carbon dioxide fuel volume ratio from about 10:90 to about 90:10; (2) a negative electrode comprising a metal selected from the group consisting of sodium, magnesium, aluminum, zinc, calcium, copper and iron metals; and (3) an electrolyte separating the positive electrode and the negative electrode. The carbon dioxide assisted metal oxygen battery in accordance with the embodiments may also include a separator also separating the positive electrode and the negative electrode.

More preferably, the M-$O_2/CO_2$ battery construction in accordance with the embodiments may alternatively use an oxygen:carbon dioxide fuel volume ratio from about 20:80 to about 80:20. More preferably the M-$O_2/CO_2$ battery construction in accordance with the embodiments uses an oxygen:carbon dioxide fuel volume ratio from about 30:70 to about 70:30.

More specifically, within a M-$O_2/CO_2$ battery in accordance with the embodiments the positive electrode may comprise a carbon material. Also, more specifically, within a M-$O_2/CO_2$ battery in accordance with the embodiments the negative electrode may comprise sodium metal. Also more specifically, within a M-$O_2/CO_2$ battery in accordance with the embodiments the negative electrode may comprise magnesium metal. Also, more specifically, within a M-$O_2/CO_2$ battery in accordance with the embodiments the electrolyte may comprise an ionic liquid.

With specific respect to the presence of an ionic liquid as an electrolyte, the presence of the ionic liquid as the electrolyte provides that a M-$O_2/CO_2$ battery in accordance with the embodiments may be rechargeable in a commercially viable fashion. Such rechargeability in the commercially viable fashion includes recharge within the context of a capacity cutoff of 800 mAh/$g_{carbon}$.

Additionally, to optimize performance of a M-$O_2/CO_2$ battery in accordance with the embodiments the cathode preferably has: (1) a surface area from about 800 to about 1500 m²/g; (2) a pore volume from about 1.5 to about 3 cm³/g; and (3) an average pore size from about 50 to about 100 Å.

Additionally, to optimize performance of a M-$O_2/CO_2$ battery in accordance with the embodiments, the anode may in addition to the foregoing metals also comprise a metal salt selected from the group including but not limited to phosphate salts, fluoroborate salts and other oxyanion salts. Specific examples of such metal salts include, but are not limited to $LiCoO_2$, $LiFePO_4$, etc., as mixed polycationic-polyoxyanionic salts.

Additionally to optimize performance of a M-$O_2/CO_2$ battery in accordance with the embodiments one may also control acidity of an electrolyte. For example a 1:1 ratio of $AlCl_3$ to imidazolium material provides a balanced acidity of an electrolyte that provides for optimal performance of a $Al$—$O_2/CO_2$ battery in accordance with the embodiments.

In that regard, one particular embodiment includes the use of: (1) aluminum as an anode; (2) a mixture of $AlCl_3$, 1-ethyl-3-methylimidazolium chloride and NaCl with a molar ratio of 2:1:0.1 as an electrolyte; and (3) a porous, conductive cathode in contact with $CO_2$. In this particular embodiment, a higher molar ratio of $AlCl_3$ to the imidazolium ionic liquid ensures the acidity of the mixture containing the needed ions of aluminum stripping during battery discharge. NaCl is used as a buffer to ensure continued acidity of the electrolyte. A battery of such architecture demonstrated a discharge capacity of over 7000 mAh/$g_{carbon}$, an increase of over 4000% compared to the same system without NaCl in the electrolyte. Changing the composition of the electrolyte enables maintaining high discharge capacity of the battery even at relatively higher temperatures. Other alkali metal chloride salts can be used instead of NaCl.

3. Experimental Details of a Na—$O_2/CO_2$ Battery

The investigated Na—$O_2/CO_2$ battery configuration is similar to other related battery constructions. An air or oxygen cathode consisted of 90% Super P (TIMCAL) carbon and 10% PVDF binder. Mechanically perforated coin cells were used for electrochemical experiments. 1 M $NaClO_4$/tetraethylene glycol dimethylether and 0.75M $NaCF_3SO_3$/1-ethyl-3-methyl imidazolium trifluromethane-sulfonate (IL) were used as electrolytes. The cells were assembled in an argon-filled glove box and fitted into a custom-built stainless steel chamber. Required concentrations of $CO_2$ and $O_2$ were premixed in a chamber at 1 atm before introducing the gas feed into the battery chamber. All galvanostatic experiments were performed at 25° C. and at a current density of 70 $mAg^{-1}$. The porous carbon electrode dimensions were 1.95 $cm^2$ with typical carbon loading of 0.76-1.28 mg/$cm^2$ and thickness of 5 μm. AC impedance measurements were conducted at frequencies from 100 kHz to 100 mHz at 10 mV bias voltage. For ex-situ TEM, FTIR and XRD analyses, discharged electrodes were vacuum dried and stored in an argon-filled glovebox.

A particular rechargeable Na—$O_2/CO_2$ battery is similar to the foregoing Na—$O_2/CO_2$ battery. The cathode is porous carbon. The anode is Na metal. The electrolyte is 1M NaTFSI in propylene carbonate. In the electrolyte was added 10% imidazolium ionic liquid tethered silica particles. See, e.g. publication number WO 2013009731 (application number PCT U.S. 2012/046020) or alternatively Lu et al., "Ionic Liquid-Nanoparticle Hybrid Electrolytes and their Application in Secondary Lithium-Metal Batteries," Adv. Mater., 2012, 24, 4430-35, the contents of which is incorporated herein by reference to the extent allowed. The cell has an open cathode so that the gas can go into the cathode and participate in the reaction. The battery can be stably recharged for over 20 cycles at a capacity control of 800 mAh/g C. A mechanism of the rechargeability is not necessarily clear.

4. Results and Discussion for the Na—$O_2/CO_2$ Battery

FIG. 1 reports the galvanostatic discharge profiles of Na-air cells (i.e., M-$O_2/CO_2$) operated under various concentrations of $O_2$ and $CO_2$. FIGS. 1A and 1B correspond, respectively, to cells using ionic liquid and tetraglyme-based electrolytes. Under a 100% $O_2$ environment, the two varieties of Na-air cells exhibit discharge capacities of 1315 $mAhg^{-1}$ and 1390 $mAhg^{-1}$, respectively (estimated based on carbon mass). The discharge profiles with the pure $O_2$ feed show a less well-defined voltage plateau at 2.3 V. This difference might be attributed to subtle differences between the electrolytes and air cathode employed in the present studies since the current rates are similar. The Na-air cells also show low discharge capacities of 183 and 173 $mAhg^{-1}$ under a pure $CO_2$ environment. Sluggish reaction kinetics between $Na^+$ ions in solution and $CO_2$ at room temperature are anticipated, which may explain the latter observation. Remarkably, the discharge capacities of both the ionic liquid and tetraglyme based Na-air cells based on feed streams containing 40% and 63% $CO_2$ are respectively 3500 and 2882 $mAhg^{-1}$; an increase of 2.6 and 2.1 times compared to the Na-100% $O_2$ case. FIG. 1C reports the relative discharge capacities as a function of $CO_2$ concentration. The variation in capacity is seen to depend on the chemical composition of the electrolytes, but there is a similar trend for the tetraglyme- and IL-based electrolytes, with the highest discharge capacities observed at intermediate $CO_2$ compositions. It demonstrates that the specific energy of a Na-air cell can be significantly enhanced, by factors of 2 to 3, by introducing optimized concentrations of $CO_2$. The threshold and criticality of capacity enhancement is around 30% and 40-63% of $CO_2$ respectively.

Figure 1A:
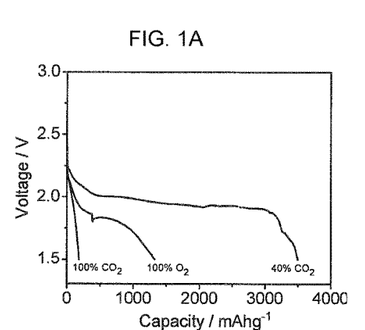
Figure 1B:
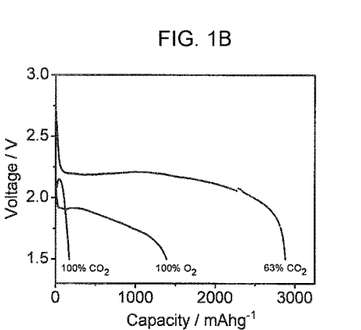
Figure 1C:
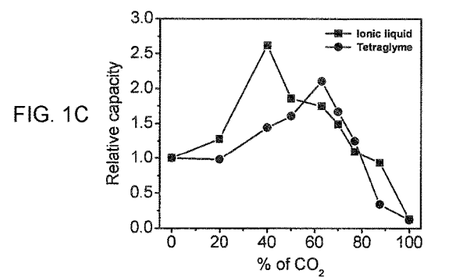
Figure 1D:
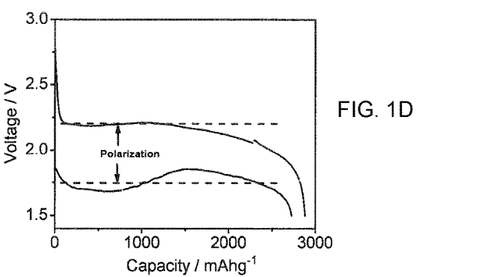
Figure 1E:
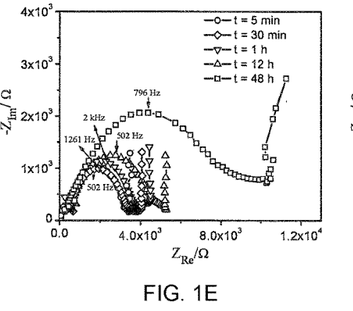
Figure 1F:
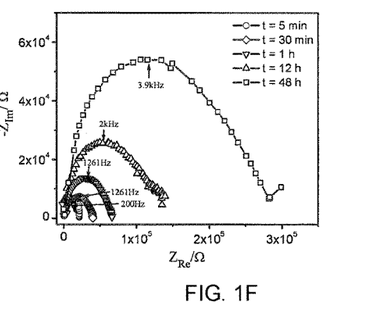

It is also apparent from FIG. 1A and FIG. 1B that irrespective of electrolyte, there is an improvement in the quality of the discharge voltage profile upon introduction of $CO_2$ to the cells. A plateau voltage around 2-2.2 V is observed in both cases. FIG. 1D shows discharge profiles obtained from two identical tetraglyme-based Na-air cells operated under $O_2$ (37%)/$CO_2$ (63%) concentrations. A polarization of ~500 mV is observed between the cells. To understand the origin of this effect, two identical Na-air cells were assembled and stored separately in Ar and $O_2/CO_2$ environments. AC impedance spectra of the cells were measured at various time periods at open circuit conditions as shown in FIG. 1E and FIG. 1F. The Nyquist plots show that the semicircles evolve with time in both cases. The results for the Ar-stored Na-air cell suggests that the electrolyte in contact with reactive Na metal forms a stable electrode/electrolyte interface over time. It is also evident from FIG. 1E and FIG. 1F that the Na-air cell stored in $O_2/CO_2$ exhibit less interfacial stability. As the Na and carbon electrodes were separated by a micrometer thick separator and no gas protective layer covers the Na anode, it is anticipated that $O_2/CO_2$ diffuse and react with Na and the reaction products induces an increase in interfacial resistance at the electrode/electrolyte interface. Because a thicker electrode/electrolyte interface is anticipated for the cells stored in the $O_2/CO_2$ environment, more energy is required for the electrochemically generated $Na^+$ ions to migrate to the cathode oxidant, which would cause the observed cell polarization.

Figure 2A:
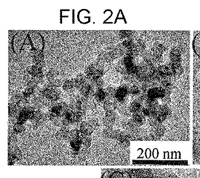
Figure 2B:
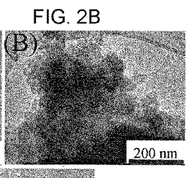
Figure 2C:
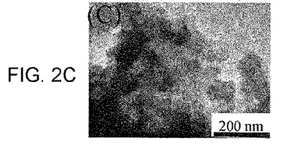
Figure 2D:
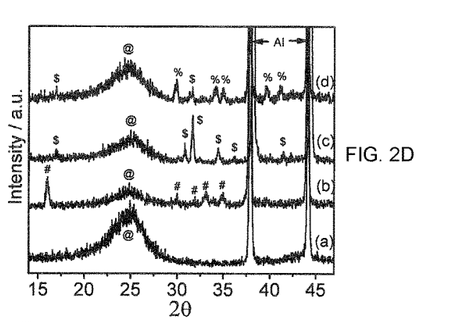
Figure 2E:
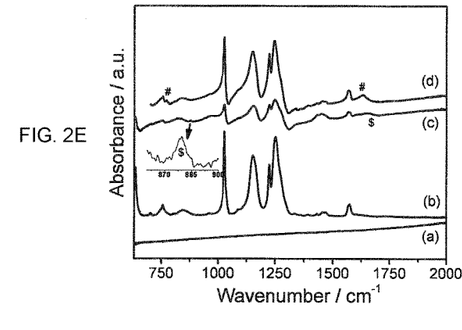
Figure 2F:
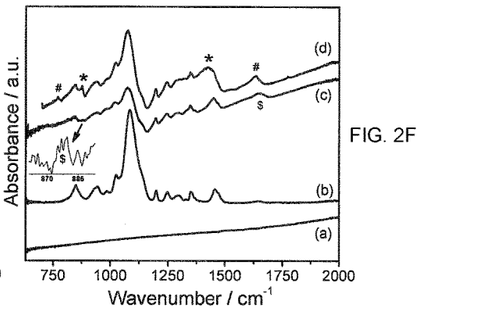

To obtain deeper insights into the overall electrochemistry and role of $CO_2$ in the Na-air cells, the discharged carbon electrodes were harvested and investigated with transmission electron microscopy, x-ray diffraction, and Fourier transform infrared spectroscopy. Ex-situ TEM images (see FIG. 2B and FIG. 2C), indicate that the porous carbon electrodes are filled with discharge products. FIG. 2D shows that additional x-ray diffraction peaks emerge in every case (FIG. 2D b-d). The peaks can be indexed to crystalline phase of $Na_2O_2$ (ICDD No. 083-0597) in case of electrodes harvested from Na-100% $O_2$ cells (FIG. 2Db). Remarkably, however, no signature of $Na_2O_2$ is found in electrodes retrieved from cells using the $O_2/CO_2$ mixed gas feed. Instead, diffraction peaks corresponding to $Na_2CO_3$ (ICDD No. 075-6816) and $Na_2C_2O_4$ (ICDD No. 075-3639) are observed. Additionally, it is apparent that while $Na_2CO_3$ and $Na_2C_2O_4$ coexist in discharged electrodes from the tetraglyme based $Na-O_2/CO_2$ cells (FIG. 2Dd), $Na_2C_2O_4$ is the dominant phase in electrodes harvested from cells using the ionic liquid electrolyte (FIG. 2Dc). Ex-situ FTIR performed on the discharged electrodes support these observations (FIG. 2E and FIG. 2F). In addition to the vibration spectral signature of the pure electrolytes, peaks at 1652 $cm^{-1}$ and 877 $cm^{-1}$ (FIG. 2Ec and FIG. 2Fc, marked by $) can be identified and assigned to vibrations from $Na_2O_2$. Peaks at 1632 $cm^{-1}$ and 775 $cm^{-1}$ (FIG. 2Ed, marked by #) respectively correspond to antisymmetric stretching and in plane deformation frequencies of O—C—O bonds of oxalates. Similarly, peaks at 1426 $cm^{-1}$ and 879 $cm^{-1}$ (FIG. 2Fd, marked by *) respectively correspond to the symmetric and antisymmetric stretching frequencies of O—C=O bonds of carbonates.

The XRD and FTIR results suggest that the following electrochemical reaction may occur to form $Na_2O_2$ in the cells that employ pure $O_2$: $O_2+2e^-+2Na^+ \to Na_2O_2$. The processes by which $Na_2CO_3$ and $Na_2C_2O_4$ are formed in cells employing a $O_2/CO_2$ mixed gas as feed are evidently more complex. Electrochemical reduction of $O_2$ and $CO_2$ are known to involve a range of complicated elementary reactions and also depends on the solvent and electrode material. It should be noted nonetheless that the fact that only $Na_2C_2O_4$ forms in ionic liquid based electrolytes, whereas both $Na_2CO_3$ and $Na_2C_2O_4$ coexist in tetraglyme cells indicates that the reactions are not hopelessly complex. Various research groups have reported on the electrochemical reduction of $O_2$ and $CO_2$. Based on the reported results and the observations above, proposed are the following reaction mechanisms for the $Na-O_2/CO_2$ cell.

Mechanism 1:

$$4O_2+4e^- \to 4O_2.^-$$

$$O_2.^-+CO_2 \to CO_4.^-$$

$$CO_4.^-+CO_2 \to C_2O_6.^-$$

$$C_2O_6.^-+O_2.^- \to C_2O_6^{2-}+O_2$$

$$C_2O_6^-+2O_2.^-+4Na^+ \to 2Na_2CO_3+2O_2$$

Mechanism 2: The $O_2$ electroreduction reaction in aprotic organic solvents is as follows. (i) $O_2+e^- \to O_2.^-$ and (ii) $O_2+2e^- \to O_2^{2-}$. Since $Na_2C_2O_4$ is also a discharge product, the following reactions are also clearly possible:

$$CO_2+O_2^{2-} \to CO_4^{2-}$$

$$CO_4^{2-}+CO_2+2Na^+ \to Na_2C_2O_4+O_2$$

Mechanism 3: The $CO_2$ electroreduction reaction in aprotic organic solvents is as follows. (i) $2CO_2+2e^- \to C_2O_4^{2-}$ and (ii) $2CO_2+2e^- \to CO_3^{2-}+CO$. Since Na-100% $CO_2$ cells also show some capacity, a direct reaction with dissolved $CO_2$ must also be possible. One may therefore propose the following reactions:

$$C_2O_4^{2-}+2Na^+ \to Na_2C_2O_4 \text{ and } CO_3^{2-}+2Na^+ \to 2Na_2CO_3$$

Considering a typical discharge voltage plateau at ~2 V in $Na-O_2/CO_2$ cells and based on the above mechanisms, it appears mechanism 1 and 2 are most probable since mechanism 3 would lead to a cell voltage of ~200 mV, with mechanism 2 dominating in the IL-based electrolyte.

Figure 3:
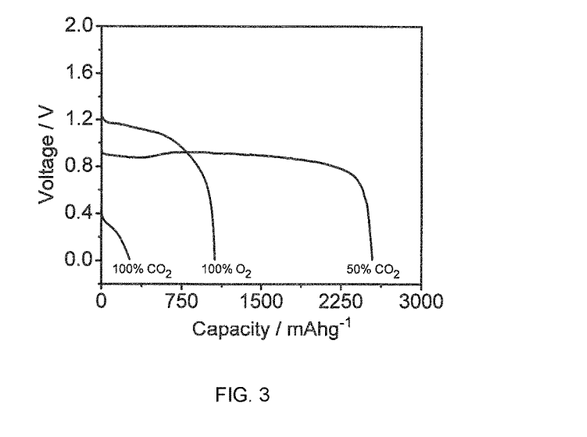
FIG. 3 shows galvanostatic discharge curves for Mg-air cells.

The same ideas outlined above would lead one to expect that electrochemical properties of non-aqueous primary metal-air cells based on other earth-abundant metals, e.g. Mg, may also be enhanced by introduction of $CO_2$. To evaluate this idea, assembled was a non-aqueous Mg-air cell as a proof of concept. 1M $Mg(ClO_4)_2$-propylene carbonate was used as electrolyte. As illustrated in FIG. 3, the Mg-air cell shows a discharge voltage plateau of ~0.9 V and close to a factor of 250% enhancement in specific energy with introduction of 50% $CO_2$.

Figure 14:
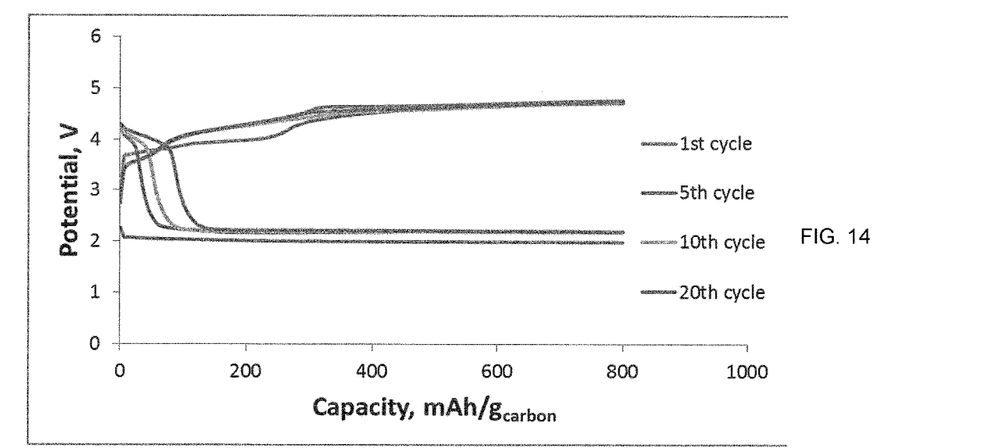
FIG. 14 shows a graph illustrating discharge capacity for a rechargeable Na—$O_2/CO_2$ battery in accordance with the embodiments.

With respect to performance characteristics of a rechargeable $Na-O_2/CO_2$ battery as described above, charge and discharge profiles were measured at: (1) a current density of 200 $mA/g_{carbon}$: (2) a capacity cutoff of 800 $mAh/g_{carbon}$: and (3) a voltage cutoff of 1.7 V for discharge and 5V for charge. Particular charge and discharge capacity profiles are illustrated in FIG. 14, where for both charge and discharge little difference is seen between 1 (bottom curve) and 20 (top curve) cycles.

Figure 15:
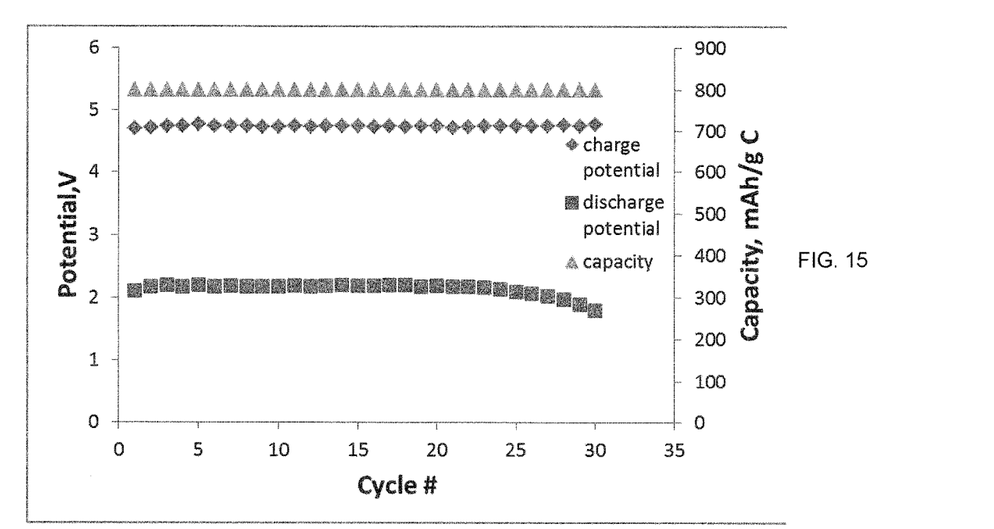
FIG. 15 shows another graph illustrating discharge capacity for a rechargeable Na—$O_2/CO_2$ battery in accordance with the embodiments.

Additional data is shown in FIG. 15, which illustrates flat and stable capacity (triangle) and charge potential (diamond), with some deterioration of discharge potential (square) above 25 charge and discharge cycles.

Figure 16A:
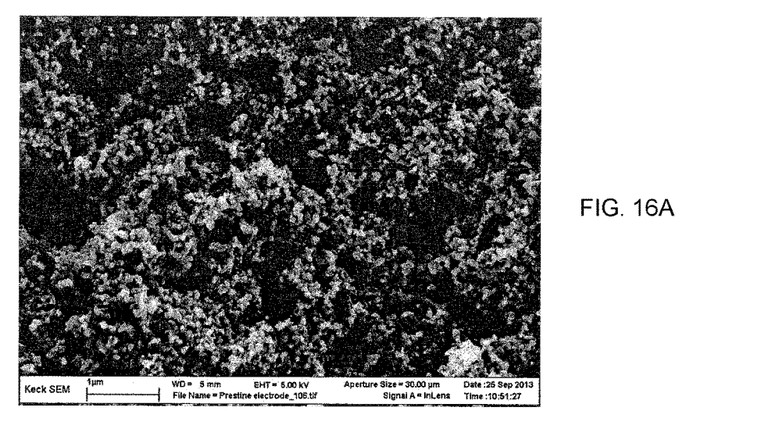
FIG. 16 shows SEM images of a cathode electrode: (a) pristine; (b) after charge; and (c) after discharge, for a rechargeable Na—$O_2/CO_2$ battery in accordance with the embodiments.
Figure 16B:
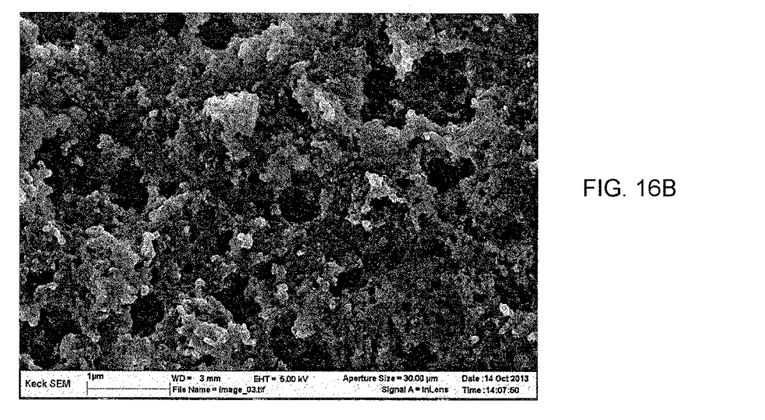
Figure 16C:
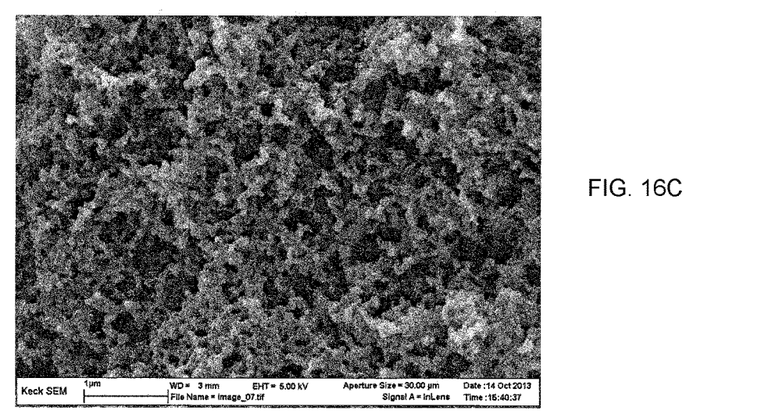

Further, FIG. 16 shows SEM images of a cathode electrode within the $Na-O_2/CO_2$ battery: (a) as pristine; (b) after discharge; and (c) after charge. As is illustrated in FIG. 16(a), the pristine cathode is an aggregation of carbon particles. As is illustrated in FIG. 16(b), after discharge the interparticle space within the cathode electrode is filled by the discharge product. As is illustrated in FIG. 16(c), after charge the carbon particles are more separate and the discharge product disappears to some extent. The foregoing observations, in particular, are consistent with the $Na-O_2/CO_2$ battery being rechargeable.

Figure 17A:
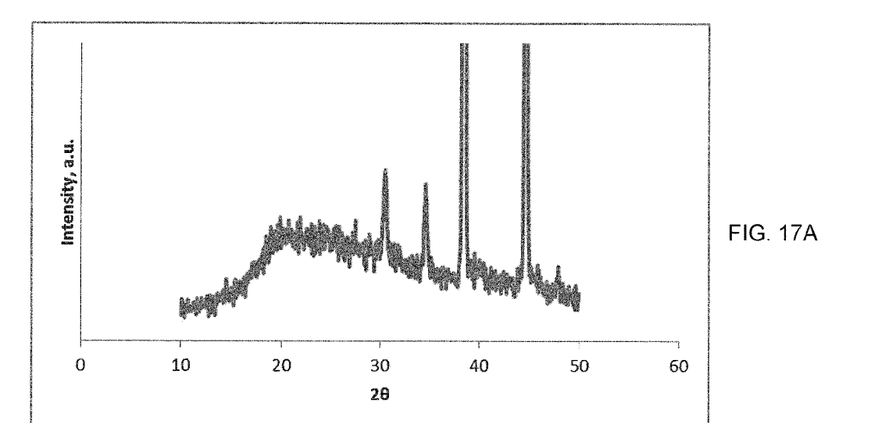
FIG. 17 shows ex-situ XRD spectra of a cathode electrode: (a) after discharge; and (b) after recharge, for a rechargeable Na—$O_2/CO_2$ battery in accordance with the embodiments.
Figure 17B:
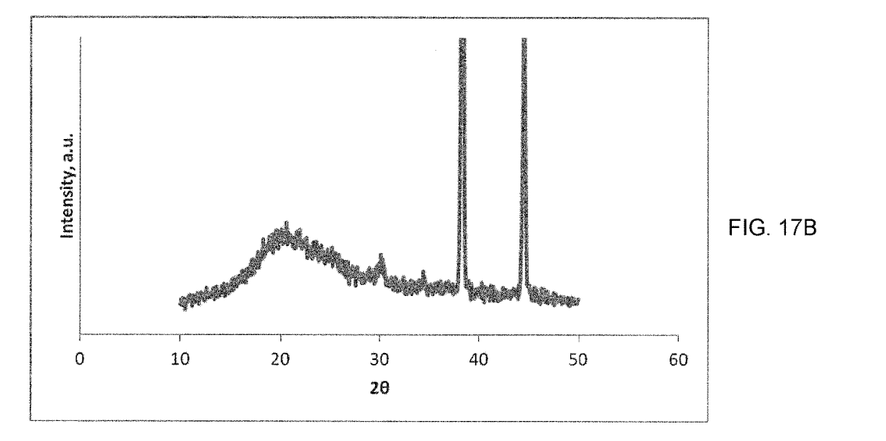

Finally, FIG. 17 shows ex-situ XRD spectra of a cathode electrode within the $Na-O_2/CO_2$ battery: (a) after discharge; and (b) after recharge. As is illustrated in FIG. 17(a) characteristic peaks of $NaHCO_3$ discharge product at about 30 and 35 degrees 2θ are apparent. However, after recharge those discharge product peaks largely disappear. This observation too is consistent with rechargeability of the $Na-O_2/CO_2$ battery. The remaining peaks at about 39 and 45 degrees 2⊖ are indicative of an aluminum substrate.

5. Conclusions for the $Na-O_2/CO_2$ Battery Configuration

In summary, investigated was a primary non-aqueous $Na-O_2/CO_2$ battery as a dual platform for converting a $CO_2$-rich gas stream to electrical energy and for capturing the $CO_2$. The Na-air battery shows enhancements of 200 to 300% when a mixed with $CO_2/O_2$ gas with high $CO_2$ content is used as fuel. Preliminary postmortem structural analysis indicates that $Na_2CO_3$ and $Na_2C_2O_4$ are formed. One may further show that metal-air batteries based on other, earth-abundant metals may also benefit from $CO_2$-enriched fuels. Also investigated was a rechargeable non-aqueous $Na-O_2/CO_2$ battery.

B.1. Temperature Effects of Metal Batteries Fueled at Least in-Part by Carbon Dioxide Mankind's total energy consumption is currently 14 TW and is projected to roughly triple by the year of 2050. In 2009 it was estimated that close to 83% of current energy needs are met by combustion of fossil fuels (coal, natural gas, and petroleum products), all of which introduce large amounts of carbon dioxide into the environment. Carbon dioxide is now understood to be one of the leading greenhouse gases. The emissions are on the order of thousands of metric tons per annum.

Recently the lithium-air battery has become the subject of intensive investigation worldwide as a promising technology for meeting growing energy demands for transportation.

Interest in the lithium air battery is fueled by its exceptionally high theoretical specific energy (11680 Wh/kg Li), which is around 90% that of commercial grade gasoline (13000 Wh/kg). The high energy density of Li-air battery comes from the fact that the cathode-oxygen harvested from the ambient air is not a part of the battery cell. Therefore, the discharge process is not limited by the consumption of the cathode material.

The chemical reaction between lithium metal and $CO_2$ gas has been known for a very long time. Lithium metal can react with $CO_2$ gas to form lithium oxalate at room temperature. At high temperature, lithium oxalate can decompose to form lithium carbonate and carbon monoxide gas:

$$2Li + 2CO_2 \rightarrow Li_2CO_3 + CO$$

2. General Considerations for Thermal Effects on Metal Batteries Fueled at Least in-Part by $CO_2$ In accordance with this aspect of a battery in accordance with the embodiments, the embodiments provide a method comprising: (1) providing a battery comprising: (a) a positive electrode contacted by at least a carbon dioxide containing fuel; (b) a negative electrode comprising a metal; and (c) an electrolyte separating the positive electrode and the negative electrode. The method also provides for (2) operating the battery at a temperature greater than about 30 degrees centigrade.

A particular battery whose performance may be enhanced in accordance with the embodiments is a carbon dioxide assisted metal oxygen battery $M-O_2/CO_2$ otherwise in accordance with the embodiments as described above. In addition, another battery whose performance may be enhanced in accordance with the embodiments is a metal carbon dioxide battery.

3. Experimental Details for Li—$CO_2$ Battery Configuration

The investigated Li—$CO_2$ battery configuration is generally similar to the Na—$O_2/CO_2$ cell described above. In particular, coin-type cells mechanically perforated on the cathode side were used for electrochemical experiments. The cathode material was created by blending conductive carbons with varying porosities, pore size distributions, and surface area with a PVDF polymer binder in NMP. A fixed mass ratio of carbon to PVDF of 9:1 was used for all of the systems studied. The NMP slurry was cast on an aluminum mesh substrate (diameter 1.6 cm) and dried. An electrolyte comprised of 1M LiTFSI in the ionic liquid 1-butyl-3-methylimidazolium bis(trifluoromethanesulfonyl) imide ([bmim][Tf$_2$N]) was used for the Li—$CO_2$ cells. The Mg—$CO_2$ cells employed 1M Mg(ClO$_4$)$_2$ in propylene carbonate (PC) and the Al—$CO_2$ cells used AlCl$_3$ dissolved in 1-ethyl-3-methylimidazolium chloride ([EMIm]Cl) in a 1.1:1 molar ratio. The cells were assembled in an argon filled glove box. The assembled cells were then sealed into a customized stainless steel chamber filled with $CO_2$ gas (1 atm pressure) and connected to the battery test stand.

4. Results and Discussion for Li—$CO_2$ Battery

Figure 4:
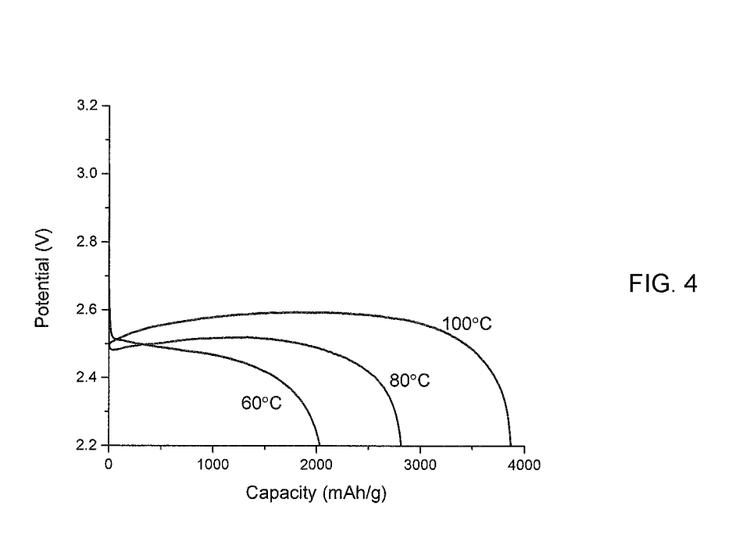
FIG. 4 shows galvanostatic discharge curves of Li—$CO_2$ cells operated at various temperatures in the range 60° C.-100° C. at a current density of 0.05 mA/cm² to the potential of 2.2V.
Figure 5:
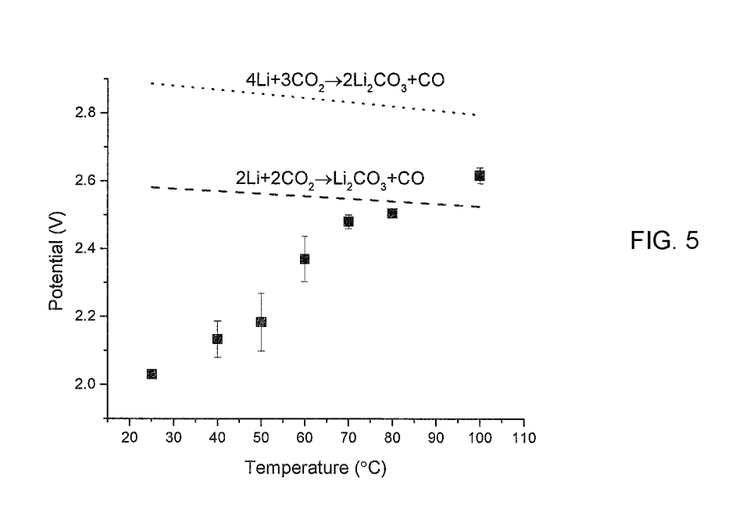
FIG. 5 shows a comparison of theoretical equilibrium potential with actual discharge potential. It is evident that the measured cell potential initially approaches the calculated equilibrium potential, but then surpasses it. Based on Tafel theory, the actual discharge potential cannot exceed the theoretical equilibrium potential, implying that the proposed reaction is likely to be only partially correct.
Figure 6A:
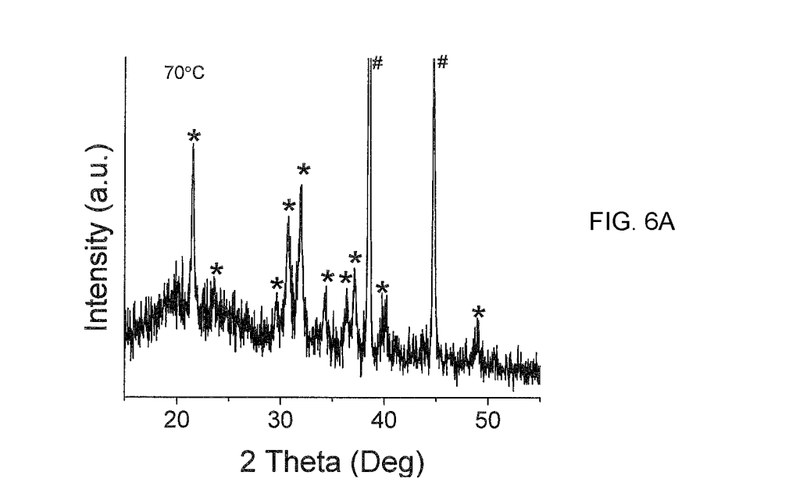
FIG. 6 shows ex-situ XRD results of the cathodes after discharge at (a) 70° C. (b) 100° C. Peaks with symbol (*) are the characteristic peaks of $Li_2CO_3$ and peaks with symbol (#) are from the aluminum substrate.
Figure 6B:
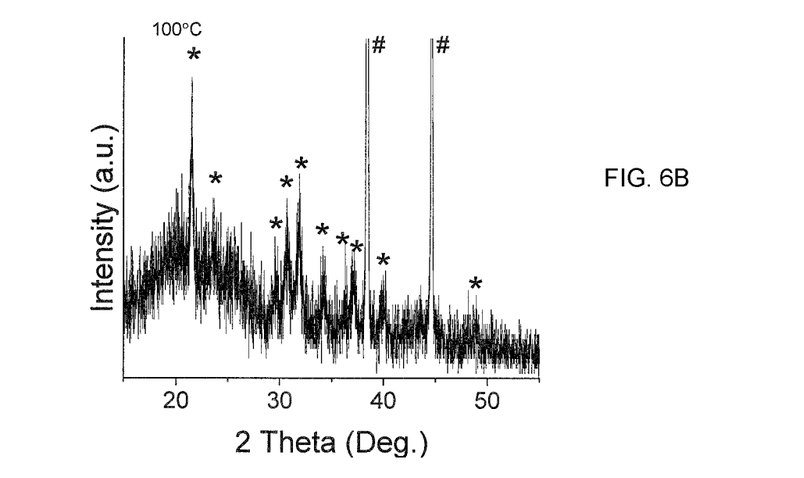
Figure 7:
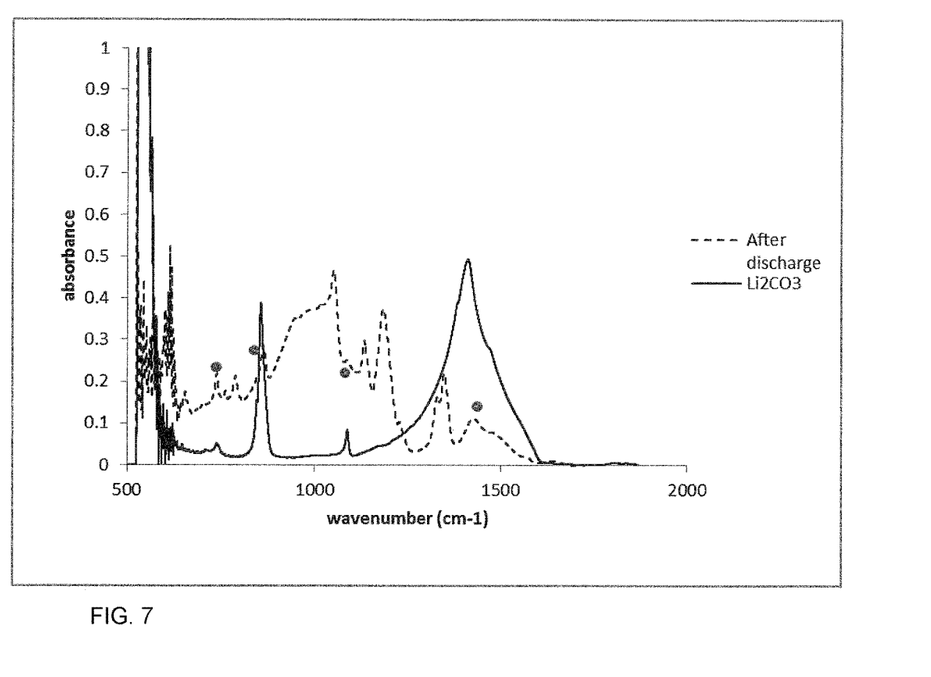
FIG. 7 shows ex-situ FTIR spectrum of a cathode electrode within a Li—$CO_2$ battery after discharge at 100° C.
Figure 8A:
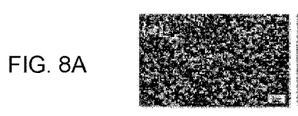
FIG. 8 shows scanning electron micrographs of Super P electrodes after discharging at different temperatures (a) pristine electrode (b) room temperature (c) 40° C. (d) 60° C. (e) 80° C. (f) 100° C.
Figure 8B:
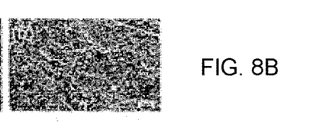
Figure 8C:
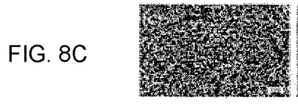
Figure 8D:
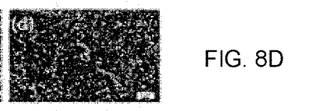
Figure 8E:
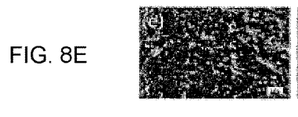
Figure 8F:
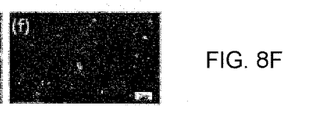
Figure 11A:
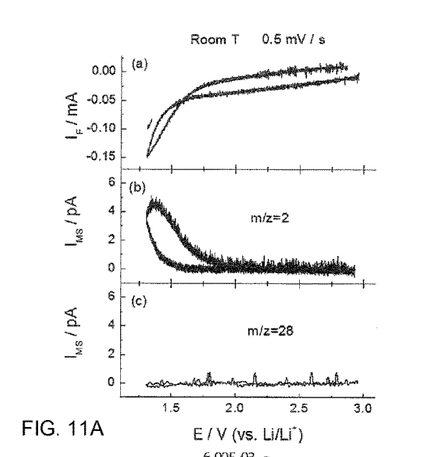
FIG. 11 shows DEMS analysis of gas phase products for Li—CO2 battery at (a) room temperature (b) 60° C. and (c) cyclic voltammetry of Li—$CO_2$ battery
Figure 11B:
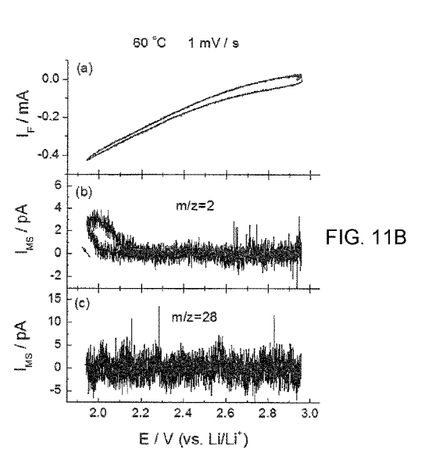
Figure 11C:
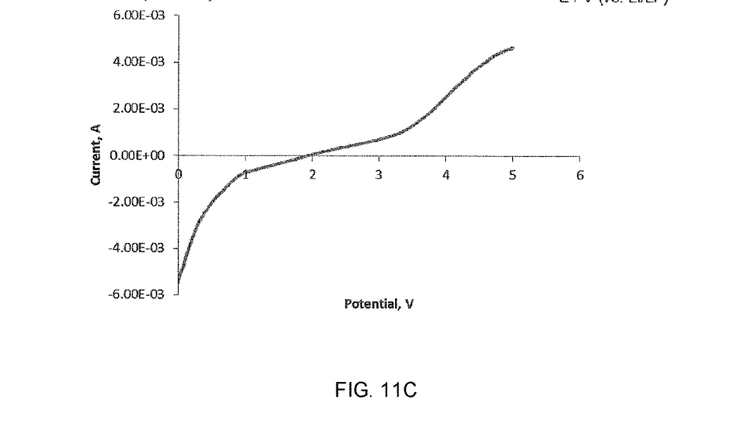

FIG. 4 shows the galvanostatic discharge curves of Li—CO2 batteries at temperatures in the range of 60° C. to 100° C. at a fixed current density of 0.05 mA/cm2 and final potential of 2V. It is apparent from the FIG. 4 that the discharge potential increases with temperature. FIG. 5 shows that the increase is not monotonic, but rather there is a "thermal trigger" region in the 40° C. to 60° C. temperature range where the largest changes in the cell discharge potential are observed. It is possible to estimate the Li—CO2 cell potential theoretically from knowledge of the electrochemical reactions underway using the formula $E = -\Delta G/zF$. $\Delta G$ is the change in Gibbs free energy, $z$ the number of electrons transferred per mole of product, and $F$ the Faraday constant. If one assumes, for example, that the simplest known reaction between Li and CO2 $2Li + 2CO_2 \rightarrow Li_2CO_3 + CO$, the cell potential is estimated based on thermodynamic data and shown in FIG. 5 dashed line. It is evident that the measured cell potential initially approaches the calculated equilibrium potential, but then surpasses it. Based on Tafel theory, the actual discharge potential cannot exceed the theoretical equilibrium potential, implying that the proposed reaction is likely only partially correct. Additional insight into the electrochemical reaction can be obtained from analysis of the gas phase composition in a Li—$CO_2$ cell using differential electrochemical mass spectrometry (DEMS) as illustrated in FIG. 11. These measurements indicate that CO is not a significant reaction product, which provides further evidence against the proposed cell reaction. It is known that CO disproportionates in an $2CO \rightarrow CO_2 + C$, but under normal conditions, the reaction rate is slow. This process is relevant in the present case because it provides a natural mechanism to explain the absence of CO in the gas phase product. Its consideration leads to the overall reaction, $4Li + 3CO_2 \rightarrow 2Li_2CO_3 + C$, where lithium carbonate is again a principal discharge product. The cell potential estimate based on this reaction is provided in FIG. 5 as the dotted line. It is apparent that the measured cell discharged potentials at elevated temperature is consistently lower than the equilibrium potentials estimated for the two proposed mechanisms, implying that this reaction could be relevant for understanding the electrochemistry of the Li—$CO_2$ cell. $Li_2CO_3$ is also evidently the principle solid discharge product for both reaction mechanisms hypothesized for the Li—$CO_2$ battery. This expectation is directly confirmed by ex-situ x-ray powder diffraction (XRD) (FIG. 6) and FTIR analysis (FIG. 7) conducted on the cathode following discharge. These measurements clearly show that $Li_2CO_3$ is an important, perhaps even the important component of the Li—$CO_2$ battery discharge product.

FIG. 8 are SEM images of the carbon cathode in the Li—$CO_2$ cell following discharge at varying temperatures. It is clearly apparent from the figure that as the operating temperature is increased, a progressively thicker film of the $Li_2CO_3$ product accumulates on the carbon cathode, eventually covering it with a contiguous-polymer like coating.

Commensurate with the increases in the cell discharge potential, FIG. 4 also clearly shows that the discharge capacity of the Li—$CO_2$ cells rise with temperature. This result is illustrated more clearly in FIG. 9, where the discharge capacity is reported as a function of temperature for Li—$CO_2$ cells utilizing porous carbon anodes with differing surface areas and pore volumes. The figure shows that irrespective of the cathode surface area and pore volume, moderate increases in the cell temperature consistently produce higher discharge capacities. However, the rate of increase is considerably lower for cells based on high surface area cathodes.

Figure 9A:
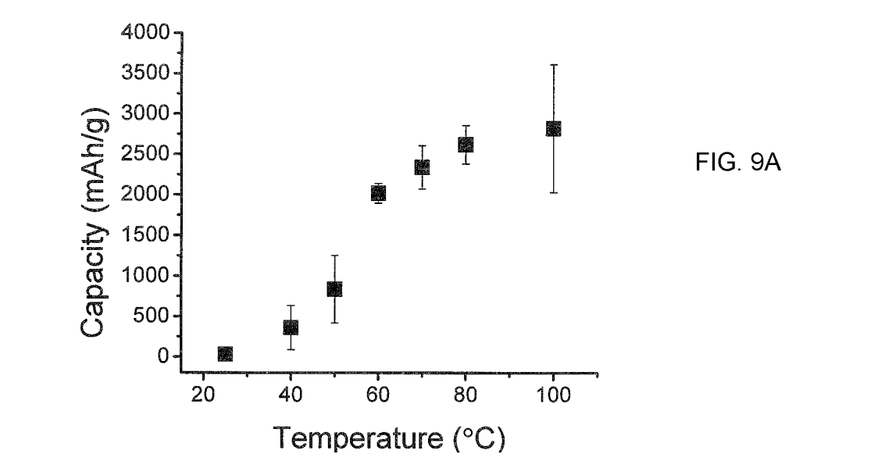
FIG. 9 shows variation of $LiCO_2$ cell discharge with temperature: (a) Super P carbon black (SA=~60 m²/g, PV=0.3 m³/g) as cathode; (b) high surface area carbon cathode (square symbol: SA=1020 m²/g, PV=45 m³/g, circle symbol: SA=1300 m²/g, PV=2.2 cm³/g).
Figure 9B:
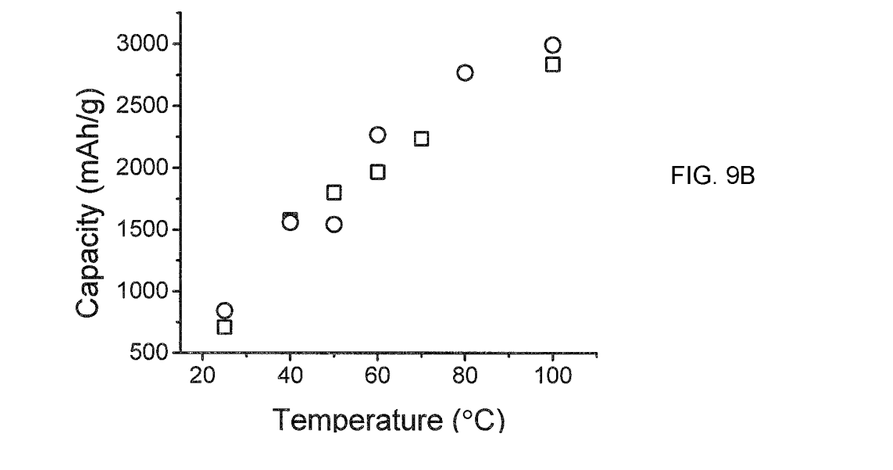

It is also noteworthy from the results in FIG. 9 that, as is the case for the cell potential, the lowest surface area super P-based carbon cathode shows a thermal triggering effect in its performance. In particular, at temperatures between 40° C. and 60° C., the discharge capacity of Li—$CO_2$ cells gassed on these cathodes rise rapidly. The discharge capacity of the Li—$CO_2$ cell at 40° C. increases by a factor of around seven. Thus, the embodiments consider operation of a battery at temperatures of at least about (or greater than about) 40° C., 60° C., 80° C. or 100° C., as well as any intervening intervals of temperature within the context of the foregoing temperature limitations.

Figure 10A:
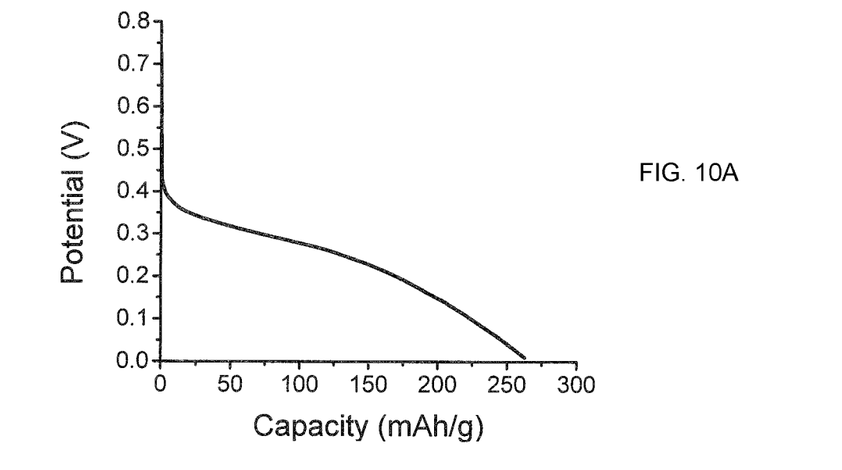
FIG. 10 shows galvanostatic discharge curves of (a) Mg—$CO_2$ battery and (b) Al—$CO_2$ battery operated at room temperature at a constant current density of 0.05 mA/cm².
Figure 10B:
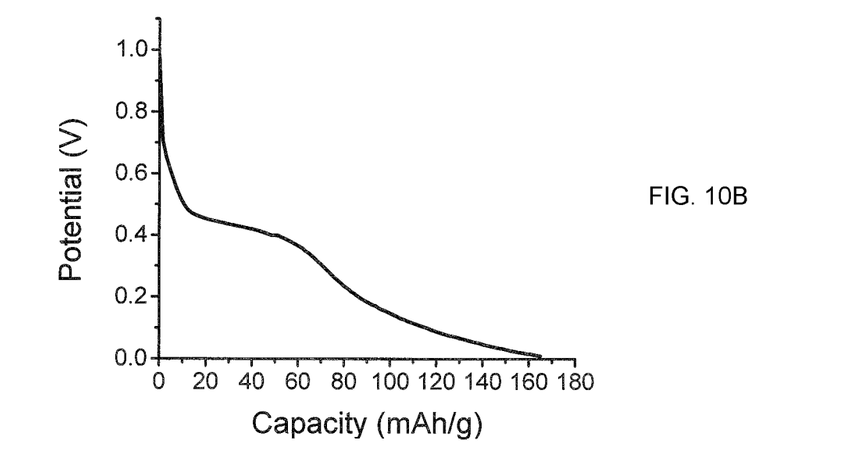

In closing, one may point out that the behaviors reported here are not unique to metal-$CO_2$ cells based on metallic lithium anodes. Similar observations have been made for cells based on magnesium (Mg), aluminum (Al), and sodium (Na) anodes (FIG. 10). All of these materials are advantageous for their greater earth-abundance and lower cost than Li. As in the case of Li—$CO_2$, however, these cells manifest low discharge capacities at room temperature, but these values can be made substantially larger using a combination of moderately higher cell operating temperatures and cathode materials with higher surface areas and pore volumes. The cell discharge potentials are also commensurately (for electrochemical reactions that produce the appropriate metal carbonates).

5. Experimental Details, Results and Discussion for Al—$CO_2$ Battery

In addition to the foregoing Li—$CO_2$ battery an Al—$CO_2$ battery was also fabricated. The Al—$CO_2$ battery also used: (1) an Al anode; (2) a porous cathode allowing the dissolution of $CO_2$ into an electrolyte (and being made by casting Ketjenblack carbon with PVDF binder (80:20) on a stainless steel current collector); and (3) the electrolyte that consisted of aluminum chloride, 1-ethyl-3-methylimidazolium chloride and sodium chloride in a molar ratio of 2:1:0.2.

Figure 12:
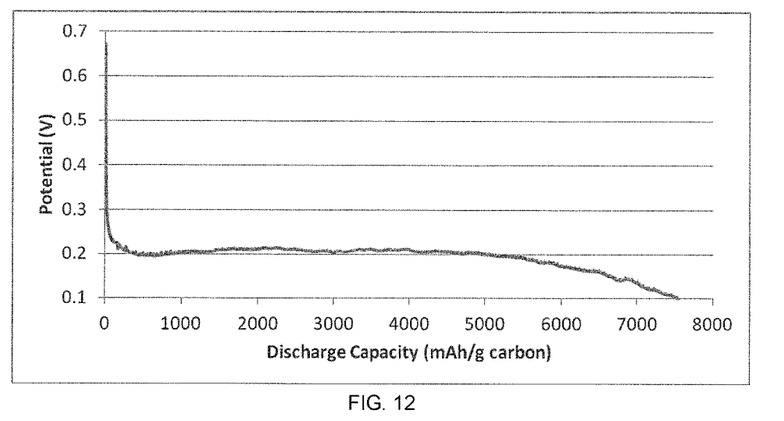
FIG. 12 shows a discharge capacity graph for a Li—$CO_2$ battery.
Figure 13:
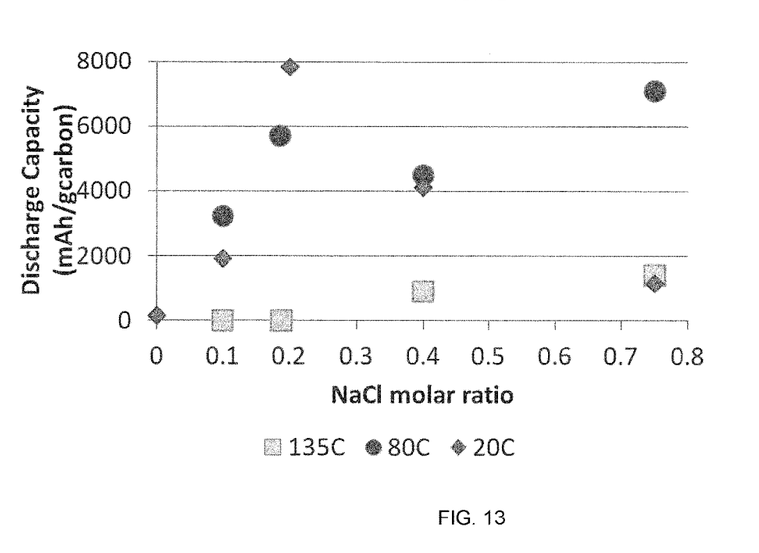
FIG. 13 shows a graph illustrating variability of discharge capacity as a function electrolyte composition for a Li—$CO_2$ battery.

FIG. 12 shows a galvanic discharge capacity of such a battery. FIG. 13 shows how changing the electrolyte composition of the foregoing battery with respect to sodium chloride molar ratio allows for maintaining a relatively high discharge of such an Al—$CO_2$ battery.

6. Conclusion

In summary, investigated was a primary Li—$CO_2$ battery as a platform for capturing $CO_2$ and producing electrical energy. The discharge capacity of Li—$CO_2$ battery showed an enhancement of about 200 times at 100° C. compared with the same battery operated at low temperature (i.e., 30° C.). Based on preliminary ex-situ analyses, $Li_2CO_3$ was concluded as an important component of the discharge products. Besides lithium, other more abundant metals like Na, Mg and Al also show promise as the anode material of a metal-$CO_2$ battery.

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A rechargeable battery comprising:
   a positive electrode contacted by an oxygen and carbon dioxide containing fuel mixture;
   a negative electrode comprising a metal material selected from the group consisting of sodium, magnesium, aluminum, zinc, calcium, copper and iron containing metal materials; and
   an electrolyte separating the positive electrode and the negative electrode, wherein the battery reduces at least a portion of $CO_2$ to $CO_4^{2-}$ in an electroreduction reaction.

2. The battery of claim 1 wherein the oxygen and carbon dioxide containing fuel mixture has an oxygen:carbon dioxide fuel volume ratio from about 10:90 to about 90:10.

3. The battery of claim 1 wherein the oxygen and carbon dioxide containing fuel mixture has an oxygen:carbon dioxide fuel volume ratio from about 20:80 to about 80:20.

4. The battery of claim 1 wherein the oxygen and carbon dioxide containing fuel mixture has an oxygen:carbon dioxide fuel volume ratio from about 30:70 to about 70:30.

5. The battery of claim 1 further comprising a separator also separating the positive electrode and the negative electrode.

6. The battery of claim 1 wherein the positive electrode comprises a carbon material and optionally a binder.

7. The battery of claim 1 wherein the negative electrode comprises sodium metal.

8. The battery of claim 1 wherein the metal material consists of at least one of a pure metal and a metal alloy including at least one metal selected from the group consisting of sodium, magnesium, aluminum, zinc, calcium, copper and iron metals.

9. The battery of claim 1 wherein the metal material comprises a metal oxyanion salt including at least one metal selected from the group consisting of sodium, magnesium, aluminum, zinc, calcium, copper and iron metals.

10. The battery of claim 1 wherein the electrolyte comprises an ionic liquid.

11. The battery of claim 1, wherein the battery is stably rechargeable for over 20 cycles.

12. The battery of claim 1 wherein $C_2O_4^{2-}$ is a dominate reduction product of $CO_2$ in the electroreduction reaction.

13. The battery of claim 1 wherein the cathode has:
   a surface area from about 800 to about 1500 $m^2/g$;
   a pore volume from about 1.5 to about 3 $cm^3/g$; and
   an average pore size from about 50 to about 100 Å.

14. A rechargeable battery comprising:
   a positive electrode contacted by an oxygen and carbon dioxide containing fuel mixture;

a negative electrode comprising a metal material selected from the group consisting of sodium, magnesium, aluminum, zinc, calcium, copper and iron containing metal materials; and an ionic liquid electrolyte separating the positive electrode and the negative electrode, wherein the battery reduces at least a portion of $CO_2$ to $C_2O_4^{2-}$ in an electroreduction reaction.

* * * * *

UNITED STATES PATENT AND TRADEMARK OFFICE
CERTIFICATE OF CORRECTION

PATENT NO. : 10,026,958 B2
APPLICATION NO. : 14/440680
DATED : July 17, 2018
INVENTOR(S) : Lynden A. Archer, Shaomao Xu and Wajdi Issam Al Sadat Page 1 of 1

It is certified that error appears in the above-identified patent and that said Letters Patent is hereby corrected as shown below:

In Claim 1, Line 10, in the second formula. It should appear as follows:
$C_2O_4^{2-}$ Signed and Sealed this
Ninth Day of October, 2018

Andrei Iancu
*Director of the United States Patent and Trademark Office*